Jan. 9, 1940.　　　　A. BATEY ET AL　　　　2,186,060
TRANSIT GEAR FOR AIRPLANES
Filed Oct. 30, 1937　　　2 Sheets-Sheet 2
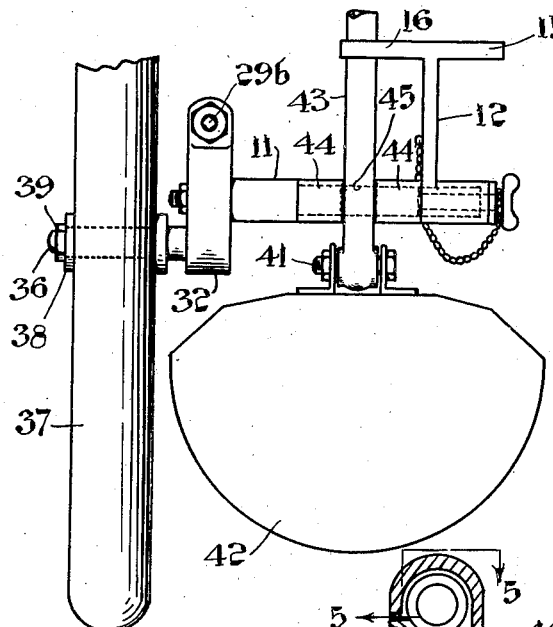
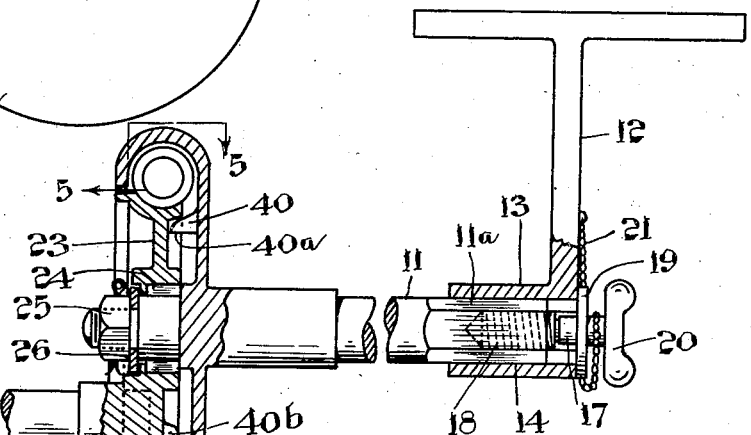
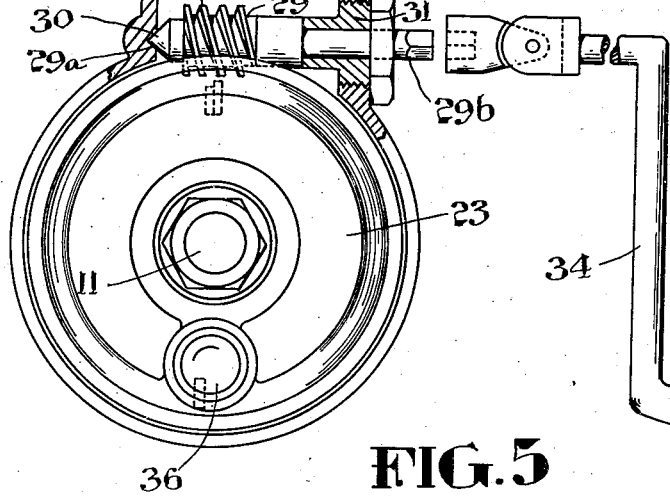
INVENTORS
ROBERT. W. COUPLAND
ALAN BATEY
BY J.D. O'Connell
ATTORNEY Patented Jan. 9, 1940

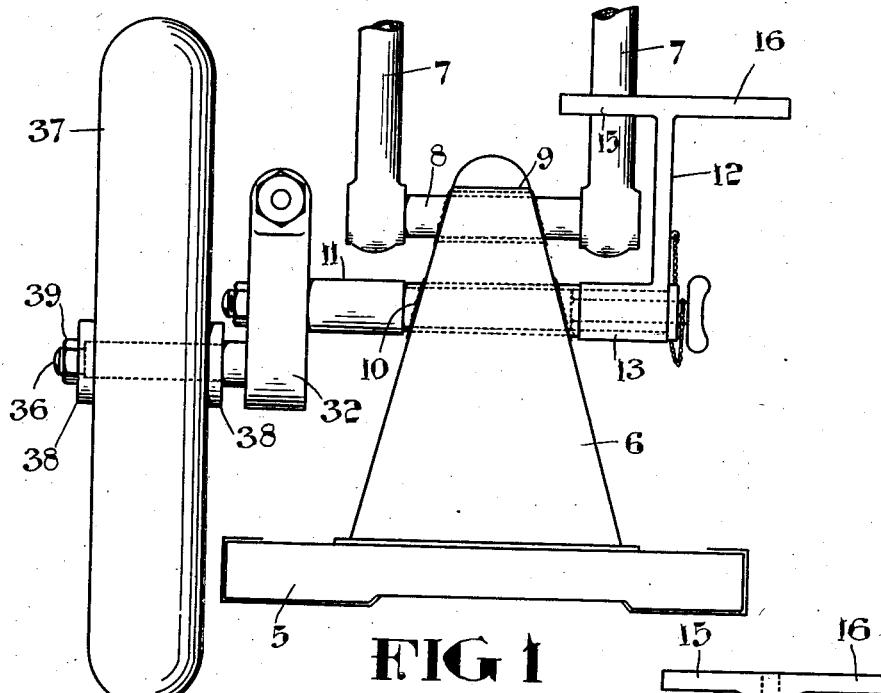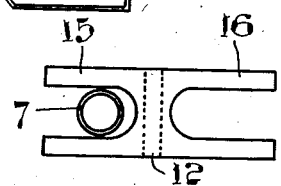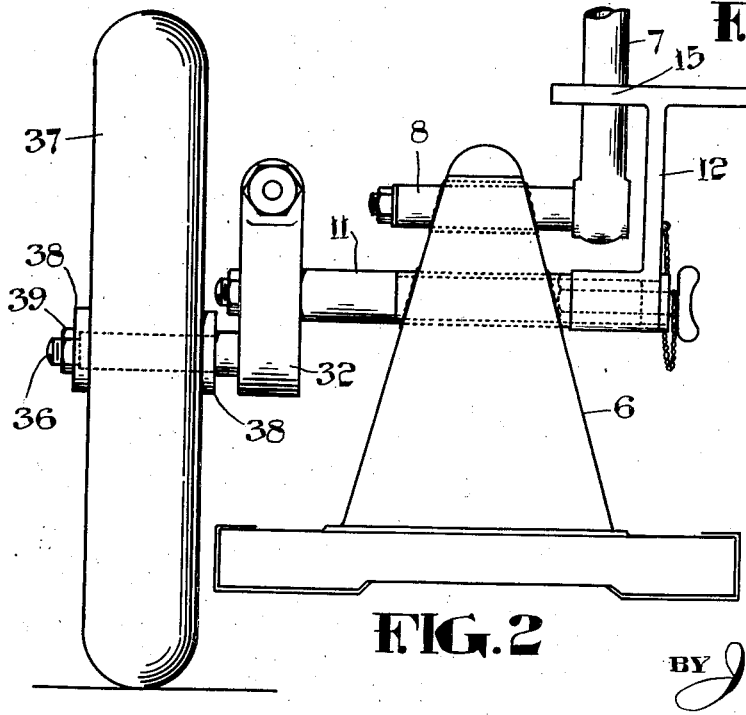

2,186,060

UNITED STATES PATENT OFFICE 2,186,060

TRANSIT GEAR FOR AIRPLANES

Alan Batey and Robert W. Coupland, Montreal, Quebec, Canada

Application October 30, 1937, Serial No. 171,848
In Canada September 25, 1937

4 Claims. (Cl. 280—61)

This invention relates to transporting attachments for airplanes and consists in the provision of wheel attachments whereby planes fitted with landing skis or floats may be easily and quickly transported over the ground or manoeuvred around on the floor of a hangar without danger of overstressing or damaging any part of the plane or undercarriage.

When a plane fitted with floats is to be brought ashore and into the hangar or when a plane fitted with skis must be moved over bare ground, this is usually accomplished by inserting rollers beneath the floats or skis and then rolling the plane in the desired direction. This method not only entails considerable time, physical energy and hardship (for it may have to be performed in sub-zero weather) but also subjects the landing gears to excessive strain and stresses beyond that which they meet in regular service. These objections are eliminated by the use of the wheel attachments provided in accordance with this invention.

In its preferred embodiment each of said attachments comprises a shaft adapted to be fixedly secured in a suitably located bushing provided in the undercarriage of the plane, a crank pin supported from said shaft so as to be capable of movement in a circular path around the axis of the shaft and a traction wheel rotatably mounted on said pin. The crank pin is cast integral with or suitably fixed to a crank disc rotatably mounted on said shaft. Operating means are provided for rotating the disc to shift the wheel toward the ground so that, when the throw of the disc (crank pin) is in excess of the ground clearance beneath the wheel, the latter will make contact with the ground. When this occurs continued rotation of the disc in the same direction results in the skis or floats being raised clear of the ground so that the plane is then supported solely by the wheels, which are suitably locked in place to prevent accidental lowering of the plane. The plane may then be quickly and easily wheeled to any desired location.

Proceeding now to a more detailed description reference will be had to the accompanying drawings, in which—

Fig. 1 is a fragmentary elevaiton of a portion of an airplane undercarriage to which our improved wheel attachment is applied. In this case the wheel attachment is shown applied to the undercarriage of a plane equipped with landing skis.

Fig. 2 is a view similar to Fig. 1 but showing the attachment applied to a slightly different type of undercarriage.

Fig. 3 is a view, similar to Figs. 1 and 2, but showing the attachment applied to the undercarriage of a plane equipped with floats.

Fig. 4 is a view, partly in elevation and partly in section, of the wheel attachment per se.

Fig. 5 is a sectional view taken on the line 5—5 of Fig. 4.

Fig. 6 is a view of an operating crank for manipulating said attachment.

Fig. 7 is a top plan view of the fork assembly.

In Fig. 1, the landing gear of an airplane is represented by the ski 5, pedestal 6, and struts 7. The ski is supported from the struts by the usual ski axle 8 which extends through a bushing 9 provided in the pedestal 6. According to the present invention the pedestal 6 is provided with a second bushing 10 located directly below the bushing 9 and adapted to receive therethrough the shaft 11 of our improved wheel attachment. Shaft 11 is held stationary in bushing 10 by a vertical member 12 terminating at its lower end in a sleeve 13 provided with a hexagonal bore 14 adapted to be fitted on the hexagonal end 11a of shaft 11. The other end of member 12 is made H-shaped as shown in Fig. 4 to provide a pair of forks 15 and 16 of unequal length. In Fig. 1 the fork 15 is shown embracing one of the struts 7 to prevent rotation of shaft 11. A screw 17 (Fig. 4) is threaded into a socket 18 in the hexagonal end of shaft 11 and is provided with a flange 19 which overlies the outer end of sleeve 13 to secure the member 12 in place on said shaft. The screw 17 is provided with a suitable turning head 20 and is preferably fastened to the member 12 by a chain 21 so that it may not be easily lost.

A disk 23 (Figs. 4 and 5) is rotatably mounted in the end of shaft 11 remote from the member 12. In the present instance the disc is shown bored to accommodate a simple type of roller bearing 24 and is held in place by a suitable nut 25 and washer 26. Teeth 27 are cut in the rim of the disc to mesh with the teeth 28 of a worm 29 rotatably supported in suitable bearings 30 and 31 provided in the upper portion of a casing 32 formed integral with the shaft 11, said casing serving to enclose both the worm 29 and the rim of the disc 23. The worm bearing 30 is constituted by a conical recess formed in the wall 33 of the casing 32 and serves to accommodate the conical end 29a of the worm shaft. The remaining worm bearing 31 comprises a bushing through which the end 29b of the worm shaft is extended beyond the gear casing 32. This last mentioned end of the worm shaft is squared to fit the square socket of a crank 34 which is used to rotate the worm 29 in either a wheel lowering or raising direction.

The disc 23 carries a crank pin 36 which is offset from the axis of shaft 11. A ground wheel 37 is secured on the pin 36 by means of the washers 38 and nut 39.

The wheel attachments described herein are initially mounted on the pedestals 6 of the undercarriage with the crank pins or wheel axles 36 lying directly above the shafts 11. The shafts 11 are then turned by the crank 34 to rotate the discs 23 so that the wheels 37 are brought nearer to the ground. When the discs have been rotated to a position where the throw of the crank pins is in excess of the ground clearance beneath the wheels the latter will then make contact with the ground so that continued rotation of the disc in the same direction will cause the landing skis to be elevated from the ground as shown in Fig. 1. The wheels are retained in this plane supporting position by the worm gear until the crank is again applied to the shafts 11 to elevate the crank pins 36.

Since the maximum vertical travel of the wheel 37 is obtained in one-half of a revolution of the disc 23, the latter is provided with suitable stops 40a and 40b adapted to engage, at the points of minimum and maximum vertical travel of the wheel, with a fixed stop 40 suitably arranged within the casing 32. A soft resilient packing 23a is fitted in a groove 23b in the rim of the disc 23 and bears against the surrounding portion of the casing 32 to form a dust seal at the mouth of the casing.

It will be understood that the wheel attachments described herein are used only to facilitate the manoeuvring or transporting of the plane from place to place over the ground and are removed when they have served this purpose.

In Fig. 2 we have shown the wheel attachment applied to a slightly modified type of undercarriage in which the ski axle 8 is supported by a single strut 7.

In Fig. 3 we have shown the manner in which the wheel attachment may be applied to an airplane fitted with floats. In this case the axle pin 41 of the float 42 is supported by a single central strut 43. The shaft 11 of the wheel attachment is supported in sleeves 44 projecting beyond opposite sides of the strut 43 in line with a transverse opening 45. In this case, owing to the length of the sleeves 44, the position of the member 12 is reversed as compared with Figs. 1 and 2 so that the locking fork 16 is disposed to embrace the strut 43.

What we claim is:

1. The combination with the undercarriage of an airplane fitted with skis or floats of wheel attachments adapted to be secured to the undercarriage of the plane to support the same for movement over the ground or around the floor of a hangar, each of said attachments comprising a shaft adapted to be mounted in a bushing provided in the undercarriage, means for holding said shaft against rotation in said bushing, a disc rotatably mounted on said shaft and equipped with a crank pin, a wheel rotatably mounted on said pin and means for rotating said disc to shift the crank pin and wheel to and from a plane supporting position.

2. The combination set forth in claim 1 wherein the last mentioned means comprises a worm journalled in bearings carried by said shaft and engaging teeth cut in the rim of said disc.

3. The combination with the undercarriage of an airplane fitted with skis or floats, of wheel attachments adapted to be temporarily secured to said undercarriage to support the same for movement over the ground or around the floor of a hangar, each of said attachments comprising a removable shaft passing through a bushing fitted in a part of the undercarriage, a removable sleeve fitted on one end of the shaft so that the shaft is held against rotation independently of said sleeve, means carried by said sleeve and engaging a part of the undercarriage to hold the sleeve against turning movement, a worm wheel rotatably mounted on the opposite end of said shaft, a worm supported from said shaft and meshing with said worm wheel, a crank pin carried by said worm wheel and a ground wheel rotatably mounted on said pin.

4. The combination with the undercarriage of an airplane fitted with skis or floats, of wheel attachments adapted to be temporarily secured to said undercarriage to support the same for movement over the ground or around the floor of a hangar, each of said attachments comprising a shaft passing through a bushing carried by a part of the undercarriage, a sleeve removably fitted on one end of the shaft so that the latter is held against turning movement independently of said sleeve, said sleeve being provided with a forked arm engaging a part of the undercarriage to hold the sleeve against turning movement, a disc rotatably mounted on the end of the shaft remote from said sleeve, a ground wheel rotatably secured to said disc to rotate about an axis eccentric to the rotational axis of the disc and means for rotating said disc.

ALAN BATEY.
ROBERT W. COUPLAND.